United States Patent [19]

Osawa

[11] Patent Number: 4,886,376
[45] Date of Patent: Dec. 12, 1989

[54] DUST-PROOF SEAL FOR LINEAR GUIDE APPARATUS
[75] Inventor: Nobuyuki Osawa, Takasaki, Japan
[73] Assignee: Nippon Seiko Kabushiki Kaisha, Tokyo, Japan
[21] Appl. No.: 167,396
[22] Filed: Mar. 14, 1988
[30] Foreign Application Priority Data Mar. 13, 1987 [JP] Japan .................. 66-36886[U]

[51] Int. Cl.⁴ .............................................. F16C 29/06
[52] U.S. Cl. .......................................... 384/15; 384/45
[58] Field of Search ................... 384/43, 15, 45, 16, 384/148; 277/DIG. 7, 164

[56] References Cited

U.S. PATENT DOCUMENTS 4,133,452 1/1979 Janian et al. .............. 277/164 X
4,595,244 6/1986 Teramachi ...................... 384/15
4,655,462 4/1987 Balsells ............................. 277/164

Primary Examiner—Stuart S. Levy
Assistant Examiner—John M. Eghtessad
Attorney, Agent, or Firm—Arnold S. Weintraub; Gerald R. Black

[57] ABSTRACT

A dust-proof seal has a metal plate attached to a slider and a rubber member adhered to the metal plate. The metal plate has an opening to allow a guide rail to pass therethrough, and the rubber member has protrusion protruding inwardly beyond the inner edge of the opening of the metal plate. A pressing member defined by a wire spring is mounted in a channel formed in the rubber member at the periphery of the lip portions and exerts a spring force to press the lip portions against the surface of the guide rail to thereby bring the lip portions elastically in contact with the guide surface to wipe out any dust deposited thereon.

5 Claims, 3 Drawing Sheets

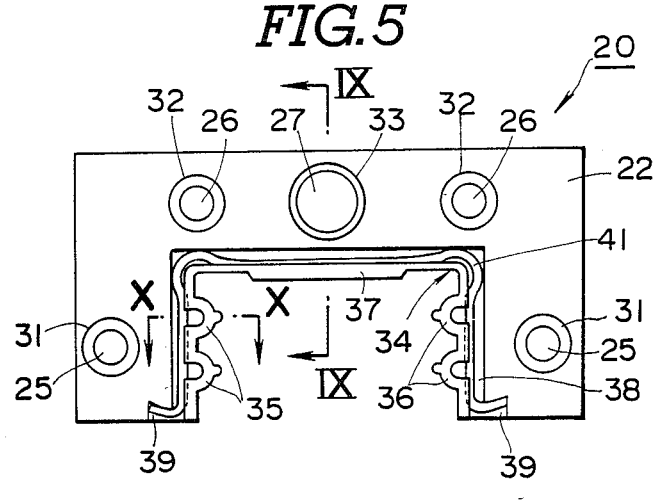
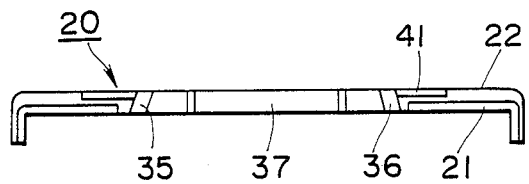
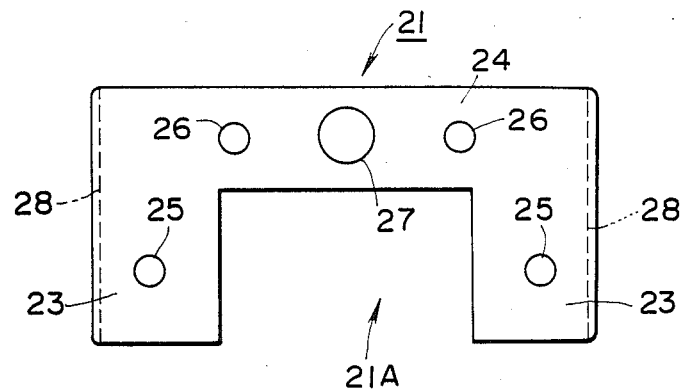

FIG. 8
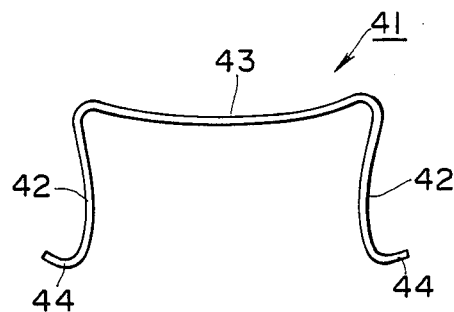
FIG. 9 　　FIG. 10 　　FIG. 11
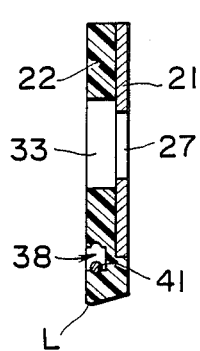 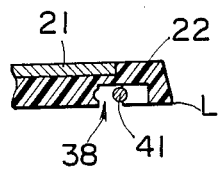 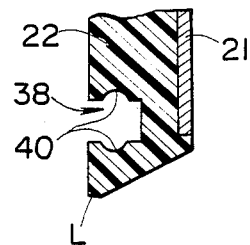
FIG. 12
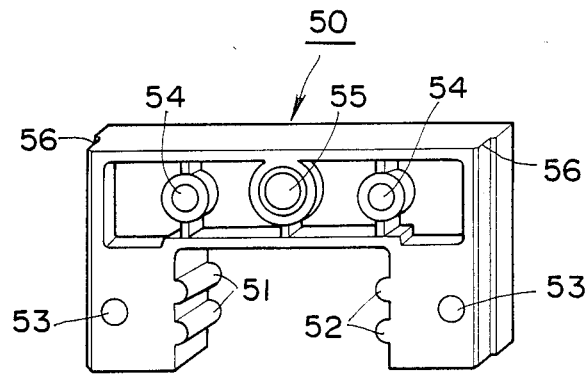

DUST-PROOF SEAL FOR LINEAR GUIDE APPARATUS

BACKGROUND OF THE INVENTION

1. Field of the Invention

The present invention relates to a dust-proof seal for a linear guide apparatus.

2. Description of the Prior Art

Generally, a linear guide apparatus includes, as shown in FIGS. 1-4, an axially elongated guide rail and a slider 2 movably mounted on the guide rail 1. The guide rail 1 has ball rolling grooves 3 formed in the outer surfaces of both side walls, and the slider, also, has ball rolling grooves (not shown) formed in the inner surfaces of side walls 4 so that the ball rolling grooves 3 of the guide rail 1, respectively, oppose the ball rolling grooves of the slider 2. A multiplicity of balls are rollably inserted between the opposing ball rolling grooves. The slider 2 moves on the guide rail 1 in the axial direction supported by the balls. As the slider 2 moves, the balls interposed the guide rail 1 and slider 2 roll and move to one end of a slider body 2A of the slider 2. Accordingly, in order to move the slider 2 continuously in the axial direction, it is necessary to circulate these balls. For this reason, ball return holes (not shown) are formed which penetrate the lateral side portion 4 of the slider body 2A in the axial direction, and at the same time, end caps 5 are provided at the front and rear ends of the slider body 2A and U-shaped connecting passages which are, respectively, in communication with the ball return holes are formed to thereby define ball circulating paths. Furthermore, since dust is deposited in the ball rolling grooves 3 and recessed path 6 of the guide rail 1 on which the slider 2 slidingly moves, and since smooth rolling of the balls and smooth movement of the slider 2 are impaired, usually, a dust-proof seal 10 is provided on the end cap 5.

As the prior art dust-proof seal 10, shown in detail in FIGS. 2 and 3 (Japanese utility model laid-open publication No. 60-103623), includes a metal plate 7 having both side edges bent to attach to the end cap 5, and a rubber member 8 adhered to the metal plate 7 and having protrusions slidably in contact with the ball rolling grooves 3 of the guide rail 1. The metal plate 7 is formed with an opening 9 to enable the guide rail 1 to pass therethrough, and the inner edge of the opening 9 is defined by straight lines. The metal plate 7 is essentially U-shaped. The rubber member 8 adhering to the metal plate 7 is provided with semi-circular protrusions 8a and 8b, and a trapezoidal protrusion 8c protruding inwardly at positions corresponding to the ball rolling grooves 3 and recessed path 6 of the guide rail 1.

Furthermore, at the tips of the protrusions 8a and 8b, and trapezoidal protrusion 8c, there are provided lip portions L (FIG. 4), which slide in the ball rolling grooves 3 and recessed path 6 to scrape dust and the like.

In such a dust-proof seal of the linear guide apparatus, the sealing property (the wiping of the dust deposited on the surface of the guide rail 1). is changed depending on the environmental conditions such as the size, shape, and the amount of dust, and the working conditions of the dust-proof seal itself such as non-uniformity of the size of component parts of the seal which affect the interference (negative clearance) for contact with the lip portions. Accordingly, in the prior art seal, for example, the wiping and the interference for contact have been adjusted by changing the size and shape of the dust-proof seal and the rubber hardness depending on the environmental conditions and working conditions.

However, when the lip portions are too hard, the sliding resistance is increased and the slide becomes unable to move smoothly. Also, any change in the size of the component parts of the seal will not be absorbed, and a gap will be formed between the lip end and the guide rail resulting in degradation of the sealing property. Conversely, when the lip portions are too soft, the wiping force is degraded, or the lip portions are caught by the edge of a hole of guide rail fixing bolt and the lip portions become reversed (turned over).

Furthermore, even when the hardness is within range, if the lip portions become worn after extended use, the required interference is no longer maintained, and the sealing property deteriorates.

SUMMARY OF THE INVENTION

An object of the present invention is to solve the above-mentioned problems and to provide a dust-proof seal for a linear guide apparatus wherein the range of elastic displacement of the lip portions is enhanced by additionally including means for pressing the lip portions against the surface of a guide rail.

In accordance with the invention, a dust-proof seal used for a linear guide apparatus includes an axially elongated guide rail elongated and having ball rolling grooves formed in outer surfaces of opposite side walls. The seal also includes; a slider movably mounted on the guide rail and having ball rolling grooves formed in inner surfaces of opposite side walls, a multiplicity of balls rollably interposed the ball rolling grooves of the slider and the ball rolling grooves of the guide rail, and end caps attached to opposite axial ends of the slider and having respectively ball circulating paths formed therein. The dust proof seal also includes comprising a metal plate attached to one of the end caps and having an opening to allow the guide member to pass therethrough, a rubber member adhered to the metal plate and having a plurality of lip portions protruding inwardly beyond an inner edge of the opening of the metal plate so that the lip portions slidably contact with the surface of the guide rail, and pressing means mounted in a channel formed around the periphery of the plurality of lip portions of the rubber member for pressing the lip portions elastically against the guide rail.

The lip portions of the rubber member of the dust-proof seal are always pressed by the pressing member elastically from the periphery against the surface of the guide rail. As a result, the follow-up capability of the tips of the lip portions is increased, and a change in sealing interference due to a change in the size of component parts of the seal is easily absorbed. Accordingly, even when the lip portions become worn, the sealing property is not degraded. Furthermore, since the pressing force of the pressing means, such as a wire spring, can be changed by changing a wire diameter or a shape of a wire spring, the adjustment of the elastic force of the lip portions can be achieved easily (as compared with replacing the rubber member).

BRIEF DESCRIPTION OF THE DRAWINGS

FIG. 5 is a front view showing an embodiment of a dust-proof seal according to the present invention;

FIG. 6 is a bottom view of the dust-proof seal of FIG. 5;

FIG. 7 is a front view of a metal plate of the dust-proof seal of FIG. 5;

FIG. 8 is a front view of a pressing member of the dust-proof seal of FIG. 5;

FIG. 9 is a sectional view taken along the line IX—IX in FIG. 5;

FIG. 10 is a sectional view taken along the line X—X in FIG. 5;

FIG. 11 is an enlarged sectional view of a lip channel in FIG. 9; and

FIG. 12 is a perspective view of an end cap to which the dust-proof seal of FIG. 5 is attached.

DESCRIPTION OF THE PREFERRED EMBODIMENT

Figure 1:
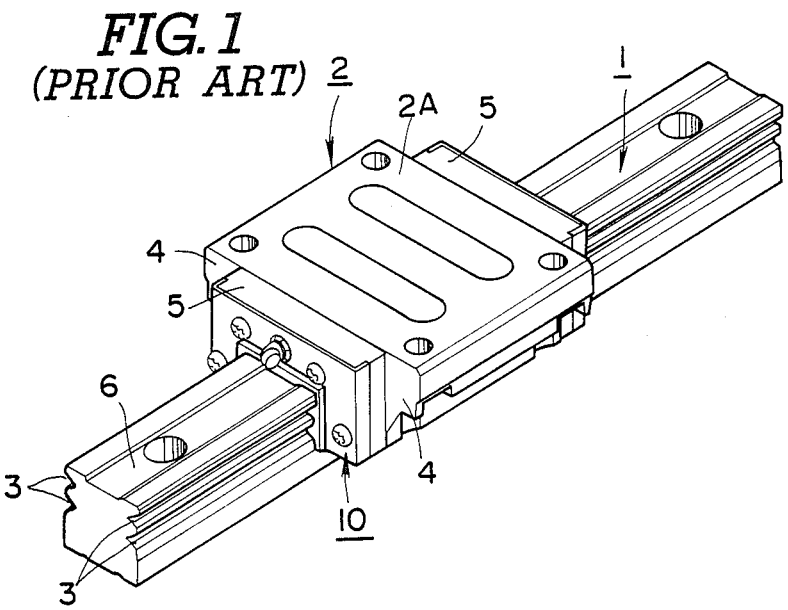
FIG. 1 is a perspective view showing an example of a prior art linear guide apparatus.
Figure 2:
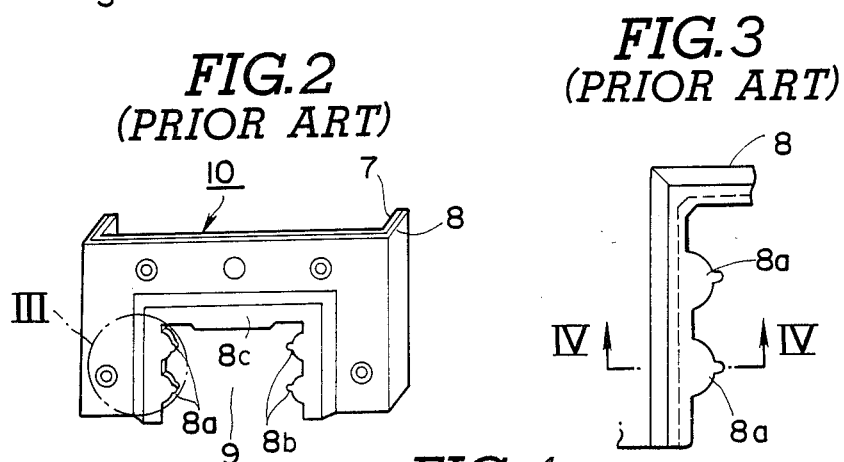
FIG. 2 is a perspective view showing a prior art dust-proof seal.
Figure 3:
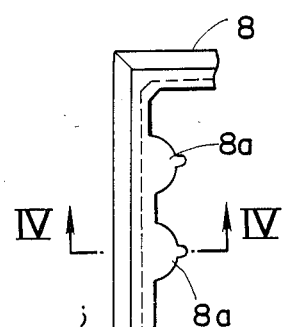
FIG. 3 is an enlarged partial front view of a portion III of FIG. 2.
Figure 4:
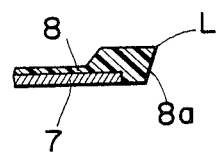
FIG. 4 is a sectional view taken along the line IV—IV in FIG. 3.

FIGS. 5 to 12 show an embodiment of the present invention, wherein a dust-proof seal 20 comprises a metal plate 21, such as a steel plate, and a rubber member 22 vulcanized and adhered to the surface of the metal plate 21.

The metal plate 21, as shown in FIG. 7, has an opening 21A formed by cutting out the central lower portion thereof, and it is generally in an inverted U-shape. A pair of rectangular leg portions 23 of the metal plate 21, respectively, have at the center thereof circular holes 25 having a small diameter, and a connecting portion 24 connecting the leg portions 23 is formed with circular holes 26 having a small diameter and a circular hole 27 having a large diameter. Each of the leg portions 23 has a bent portion 28 formed by bending a side edge portion at right angles to extend rearwardly.

The rubber member 22 is formed with a large thickness of about three or four times as thick as the plate thickness of the metal plate 21. The rubber member 22 also has circular holes 31, 32 and 33 at positions respectively corresponding to the circular holes 25, 26 and 27 of the metal plate 21. The diameters of the circular holes of the rubber member 22 are somewhat larger than the diameters of the circular holes of the metal plate 21. The rubber member 22 is adhered to the metal plate 21 to cover substantially the whole surface of the metal plate 21. The rubber member 22 has an inwardly extended portion 34 along the inner edge of the opening 21A of the metal plate 21 as if the extended portion 34 formed an edging. The rubber member 22 is provided with semi-circular protrusions 35 and 36 at positions corresponding to that of the ball rolling grooves 3. The rubber member, also, has a trapezoidal protrusion 37 at a position corresponding to that of the recessed path 6 of the guide rail 1. The shape of the semi-circular protrusions 35 and 36 is not limited to the semi-circular shape and, thus, a triangular shape may be adopted to match the shape of the ball rolling grooves 3 of the guide rail 1.

Each of the tips of the extended portion 34, semi-circular protrusions 35 and 36, and trapezoidal protrusion 37 is formed with a lip portion L having a sharp angle at the front surface side (the surface opposite to the side to which the bent portion 28 is extending) as shown in FIGS. 9 to 11. This lip portion L is in contact with the surface of the guide rail 1 with an appropriate interference (a negative clearance) to wipe out the dust or the like deposited on the surface of the guide rail 1. For this purpose, the size, shape, and hardness of the lip portion L are preselected so as to be elastically deformed depending on the particle size, quantity, type, etc., of the deposited dust. A recessed channel 38 is formed at the periphery of the lip portions L along the inner edge of the opening 21A of the metal plate 21 surrounding the lip portions L, and each channel end 39 of the recessed channel 38 is extended horizontally along the bottom side of the rubber member 22.

In the inner wall of the recessed channel 38, at least at the side of the lip portions L, there is formed a groove 40 as shown in FIG. 11. A pressing member 41 having a curved shape, as shown in FIG. 8, is mounted in the recessed channel 38 so as to be fitted into the groove 40. The pressing member 41 is, for example, a spring formed by a steel wire such as a piano wire, and the pressing member 41 presses the lip portions L elastically from the side of the periphery so as to bring the lip portions L in close contact with the guide rail 1. In this case, the pressing member 41 elastically presses the semi-circular protrusions 35 and 36 by a spring force exerted by inwardly curved portions 42 which rise from the bottom at the right and left sides, and at the same time, elastically presses the trapezoidal protrusion 37 of the rubber member 22 against the guide rail 1 by a spring force exerted by an upper side curved portion 43 and lower side curved portions 44.

The dust-proof seal 20 as described above is attached to an end cap 50 as shown in FIG. 12. The end cap 50 is made from a synthetic resin and, generally, has an inverted U-shape similar to the dust-proof seal 20. Furthermore, the end cap 50 is provided with semi-circular protrusions 51 and 52 corresponding to the protrusions 35 and 36 of the rubber member 22, and is provided with circular holes 53, 54, and 55, respectively, corresponding to the circular holes 31, 32, and 33 of the rubber member 22. The bent portions 28 of the dust-proof seal 20 are fitted to stepped portions 56 of the end cap 50, and the dust-proof seal 20 is fixed to the slider body 20A together with the end cap 50.

When the slider 2, having the dust-proof seal 20 fixed thereto, together with the end cap 50, is moved on the guide rail 1, with the travelling of the slider 2, the lip portions L of the dust-proof seal 20 wipe the dust deposited on the surfaces of the ball rolling grooves 3 and the recessed path 6 of the guide rail 1. In this case, since the lip portions L exert a pressing force due to the elasticity of the rubber together with the additional spring elasticity of the pressing member 41, a wiping force of the lip portions L becomes large even when the lip portions L are rather soft. As a result, much more dust can be removed efficiently as compared with the prior art seal.

In addition, since the spring force of the pressing member 41 is stable, the slide resistance force of the lip portions L is also stabilized, and the movement of the slider 2 is very smooth. Accordingly, it is very advantageous for the dust-proof seal 20 hereof to be used in a dusty environment or for large size apparatuses. Furthermore, the adjustment of the wiping force of the lip portions L can be achieved by changing the wire diameter or the shape of the pressing member 41. This is very easy, as compared with changing the hardness of raw rubber, or by changing the shape and size of the lip portions L. Accordingly, it is easy to change the environmental condition of the seal. Moreover, even when the lip portions L are worn, since the wiping force is not decreased due to the addition of the elastic force of the pressing member 41, the sealing property is seldom deteriorated. In addition, the interference of the lip portions L may be relatively small, and the lip portions L will not be reversed or damaged by a bolt hole of a rail fixing bolt formed in the surface of the recessed path 6 of the guide rail 1.

While in the above embodiment, the pressing member 41 is described as being formed by a wire material having a circular cross section, the pressing member 41 is not limited to this and a leaf spring having a square cross section may be used.

As described in the foregoing, in the present invention, the pressing member is mounted at the periphery of the lip portions of the rubber member of the dust-proof seal to press the lip portions against the surface of the guide rail. As a result, the wiping force or the contact interference of the dust-proof seal can be adjusted by the spring force of the pressing member without changing the shape or hardness of the lip portions. Accordingly, the setting of the sealing property can be achieved quickly and easily depending on the environmental conditions. It is possible to prevent the deterioration of the sealing property due to wear of the lip portions, and the smooth operation and life of the linear guide apparatus can be prolonged.

I claim:

1. A dust-proof seal used in a linear guide apparatus which includes a guide rail elongated in an axial direction and having ball roller grooves respectively formed in outer surfaces of opposite side walls, a slider mounted movably on said guide rail and having ball roller grooves respectively formed in inner surfaces of opposite side walls, a multiplicity of balls rollably interposed between the ball rolling grooves of said guide rail and the ball rolling grooves of said slider, and a pair of end caps attached respectively to axial opposite ends of said slider and having respectively ball circulating paths formed therein, said dust-proof seal comprising:
   a rigid plate attached to one of said pair of end caps, said plate having an opening to allow said guide rail to pass therethrough;
   a flexible member adhered to said plate and having a plurality of lip portions protruding inwardly beyond an inner edge of said opening of said plate, said flexible member having a protruding portion extending inwardly beyond said inner edge of said opening of said plate, a channel formed in said flexible member at a periphery of said lip portions and said protruding portion; and
   a pressing member mounted on a channel formed in said flexible member at a periphery of said lip portions for pressing said lip portions and said protruding portion elastically against a surface of said guide rail, being held within said channel, said pressing member essentially having an inverted U-shape and comprising two standing portions, two lower portions at the ends of said standing portions and a lateral portion connecting the upper portions of said standing portions;
   wherein, said two standing portions are curved inward and said lateral portion is curved downward, such that said pressing member presses said lip portions and said protruding portion, and said pressing member is supported at substantially all portions by said rigid plate in the axial direction of said guide rail.

2. A dust-proof seal according to claim 1 wherein said pressing member is a wire spring having curved portions to exert a spring force.

3. A dust proof seal according to claim 1, wherein said channel is internally recessed so that the inside of said channel is wider than the opening.

4. A dust-proof seal according to claim 1, wherein said each lower portion of said standing portions is curved outwardly and then upwardly so as to contact the upper inside wall of the lower ends of said channel.

5. A dust-proof seal used in a linear guide apparatus which includes a guide rail elongated in an axial direction and having ball roller grooves respectively formed in outer surfaces of opposite side walls, a slider mounted movably on the guide rail and having ball roller grooves respectively formed in inner surfaces of opposite side walls, a multiplicity of balls rollably interposed between the ball rolling grooves of the guide rail and the ball rolling grooves of the slider, and a pair of end caps attached respectively to axial opposite ends of the slider and having respectively ball circulating paths formed therein, the dust-proof seal comprising:
   a rigid plate attached to one of said pair of end caps, the rigid plate having an opening to allow the guide rail to pass therethrough;
   a flexible member adhered to the rigid plate, the flexible member having a plurality of lip portions protruding inwardly beyond an inner edge of the opening of the rigid plate, the flexible member being disposed along a surface of the opening;
   a channel disposed between the flexible member and the rigid plate; and
   an elongated resilient member being tightly disposed within the channel, the resilient member being supported by the rigid member, the pressing member essentially having an inverted U-shape and comprising two standing portions, two lower portions at the ends of the standing portions and a lateral portion connecting the upper portions of the standing portions, the resilient member applying pressure to the lip portions, the pressure being transferable to the opening.

* * * * *

UNITED STATES PATENT OFFICE
CERTIFICATE OF CORRECTION

Patent No. 4,886,376          Dated December 12, 1989

Inventor(s)   Nobuyuki Osawa

It is certified that error appears in the above-identified patent and that said Letters Patent is hereby corrected as shown below:

On the cover sheet of the patent, column 1, under the heading:

[30] Foreign Application Priority Date the Japanese reference

"66-36886 [U]" should read --62-36886[U]--.

Signed and Sealed this

Fourth Day of December, 1990

Attest:

HARRY F. MANBECK, JR.

*Attesting Officer*         *Commissioner of Patents and Trademarks*